(12) United States Patent
Su et al.

(10) Patent No.: US 7,554,895 B2
(45) Date of Patent: Jun. 30, 2009

(54) APPARATUS AND METHOD FOR CONTROLLING DATA WRITE OPERATIONS IN OPTICAL STORAGE SYSTEM

(76) Inventors: Ting-Wen Su, 8Fl., No. 533, Chung-Cheng Rd., Hsien-Tien, Taipei (TW) 231; Sung-Hung Li, 8Fl., No. 533, Chung-Cheng Rd., Hsien-Tien, Taipei (TW) 231; Yi-Lin Lai, 8Fl., No. 533, Chung-Cheng Rd., Hsien-Tien, Taipei (TW) 231

( * ) Notice: Subject to any disclaimer, the term of this patent is extended or adjusted under 35 U.S.C. 154(b) by 538 days.

(21) Appl. No.: 10/756,779

(22) Filed: Jan. 14, 2004

(65) Prior Publication Data

US 2004/0160878 A1   Aug. 19, 2004

(30) Foreign Application Priority Data

Jan. 15, 2003   (TW) ............................... 92100819 A

(51) Int. Cl.
   *G11B 7/00* (2006.01)
(52) U.S. Cl. ..................................... 369/116; 369/53.26
(58) Field of Classification Search ...................... None
   See application file for complete search history.

(56) References Cited

U.S. PATENT DOCUMENTS 5,477,557 A * 12/1995 Inaba et al. ............... 372/38.02
5,822,236 A * 10/1998 Dosho et al. ................. 365/45

6,792,013 B2 * 9/2004 Ishiwata et al. ............... 372/33

FOREIGN PATENT DOCUMENTS

| EP | 0314390 | 5/1989 |
| EP | 0402081 | 12/1990 |
| EP | 1341164 | 9/2003 |
| KR | 20020070711 | 9/2002 |

* cited by examiner

*Primary Examiner*—Joseph Feild
*Assistant Examiner*—Tawfik Goma
(74) *Attorney, Agent, or Firm*—Perkins Coie LLP

(57) ABSTRACT

An apparatus and method for controlling an operation of recording data employed in an optical storage system is disclosed. The apparatus has a sampling-and-holding circuit, an operational amplifier, a plurality of gain amplifiers, and a plurality of switches. The apparatus operates under a short-term open mode, a long-term open mode, and a closed-loop mode sequentially in response to control signals and close/open statuses of the switches. A write-control signal is initialized by using a virtual ground effect within the short-term mode. In the long-term mode, the write-control signal is charged to a voltage level suitable for recording data onto a compact disk, while the charged write-control signal is employed to record data on the compact disk within the closed-loop mode.

27 Claims, 8 Drawing Sheets

APPARATUS AND METHOD FOR CONTROLLING DATA WRITE OPERATIONS IN OPTICAL STORAGE SYSTEM

BACKGROUND OF THE INVENTION

1. Field of the Invention

The present invention relates to an apparatus and method for controlling a data write operation in an optical storage system, and particularly to a write-control apparatus and method used in an optical storage system wherein a write-control signal associated with the write operation is rapidly charged to an adapted level for writing data onto a compact disk (CD) so as to avoid malfunction in data writing.

2. Description of Related Art

Currently, the optical storage systems and corresponding media are becoming more and more popular. Thereby, the electronic devices, such as notebook computers, personal computers, are equipped with a CD re-writer (CD-RW) for writing data, images, etc. to write once read multiple (WORM) or recordable CDs so as to provide a great convenience to users.

Referring to FIG. 1, the architecture of a conventional CD-RW is illustrated. The CD-RW includes a read-control device 10, a write-control device 20, and a read/write head 30. When the conventional CD-RW is desired to read or write data, the read/write head 30 generates a current $i_D$ flowing through a laser diode 301 so as to derive a laser light beam to project onto a CD 40 for reading or writing data operations. A monitor diode 302 of the read/write head 30 generates a current $i_M$ based on the laser light beam according to the laser diode 301. An operation amplifier 303 generates a feedback control signal FPDO based on the current $i_M$ for performing an automatic power control to the read-control device 10 and the write-control device 20.

When reading data, a driving IC 304 of the read/write head 30 only enables a read-enable signal ENR in accompanied with a current $i_D$ described as in eq1(a) flowing through the laser diode LD. When writing data, the driving IC 304 of the read/write head 30 enables a read-enable signal ENR and a write-enable signal ENW so that a current $i_D$ described as in eq1(b) will pass through the laser diode LD. The current $i_D$ in the laser diode can be described as follows:

$$i_D = \begin{cases} \dfrac{VRDC}{Rset1 + R_A} \times gain1 & \text{if } ENR \in \text{enable} \quad \text{eq 1(a)} \\ \dfrac{VRDC}{Rset1 + R_A} \times gain1 + \\ \dfrac{VWDC}{Rset2 + R_B} \times gain2 & \text{if } ENR, ENW \in \text{enable,} \quad \text{eq 1(b)} \end{cases}$$

where gain 1 and gain 2 are current gains of the INR and INW channels, VRDC and VWDC are read-control signal and write-control signal, respectively, the $R_A$ and $R_B$ are internal resistors of the driving IC 304.

Obviously, the current $i_D$ flowing through the lased diode LD is different as shown in FIG. 2 when the laser diode 301 reads or writes data. Generally, the laser diode 301 needs a large amount of current for writing data to a CD 40.

The circuit of the write control device 20 is illustrated in FIG. 3. The sampling frequency of the sampling and holding circuit 201 is far higher than the variation of the feedback voltage FPDO. Therefore, the output voltage of the sampling and holding circuit 201 is represented by FPDO. The voltages of nodes in the circuit of FIG. 3 are analyzed as the following:

$$dV2 = Vref - FPDO$$

$$VWDC = DAC2 + (Rf2/Ri2)*(DAC2 - dV2*G12)$$

where Rf2/Ri2≈150. Thus, the output voltage of the operation amplifier 202 is varies from 0.5 to 4.5V. Basically, when the write-control device 20 is to be operated normally, the operation amplifier 202 must operate within a linear region to prevent its output voltage from being saturated. Namely, when the second digital-to-analog control signal DAC2 is approximately equal to dV2*G12, the operation amplifier 202 will operate in the linear region. From the above, it is known that since the write-control device 20 is a negative feedback configuration, the operating point Q will be found automatically. When the write control device 20 operates around the operating point, the voltage of the writing-control signal VWDC delivers to the read/write head 30 will be at a working voltage with little disturbances. The perturbation frequency is about 20 Hz~20 KHz. Thereby, a capacitor C2 is installed in the circuit for canceling the vibration. Likewise, a capacitor C1 is installed in the read-control device 10 for the same purpose.

When writing data to a CD, a time period control signal WLDON is at a high level. However, the write-control signal VWDC will be charged to an operating voltage slowly as shown in FIG. 4 due to the effects of the capacitor C2. As illustrated, in time period dT, if the write-control signal dose not achieve the operating voltage, the current $i_D$ of the laser diode 301 illustrated in formula eq1(b) cannot reach a current sufficient for writing data onto a CD. As a result, a malfunction in writing data to a CD may occur.

SUMMARY OF THE INVENTION

In one embodiment, the disclosed apparatus for controlling data write operation in an optical storage system includes an operational amplifier having a positive input end, a negative input end and an output end for outputting a write-control signal at the output end. The operational amplifier may operate under one of a short-term mode, a long-term mode and a closed-loop mode. In the short-term mode, the operational amplifier is formed as a voltage follower for initializing the write-control signal. In the long-term mode, the operational amplifier charges the write-control signal. In the closed-loop mode, the charged write-control signal may be employed to record data onto a CD.

In the embodiment of, the disclosed method for controlling a data write operation in an optical storage system includes the steps of: executing a short-term mode for initializing a write-control signal by virtual ground; executing a long-term mode for charging the write-control signal by virtual ground; and executing a closed-loop mode for employing the charged write-control signal for writing data to a compact disk.

In the embodiment, the read/write device used in an optical storage system encompasses a read-control device for generating a read-control signal in response to a feedback control signal; and a write-control device having an operational amplifier for generating a write-control signal in response to the feedback control signal. The operational amplifier is formed as a voltage follower for initializing the write-control signal when operating under the short-term mode. Under the long-term mode, the operational amplifier charges the write-control signal. The charged write-control signal is used to control the writing of data to a compact disk when the operational amplifier is operated under a closed-loop mode. The read/write head generates a laser beam in response to the read-control signals, the write-control signals, a read-enable signal, and a write-enable signal, wherein the read/write head generates a feedback signal based on the laser beam for being fed back to the read-control device and the write-control device.

The various objects and advantages of the present invention will be more readily understood from the following detailed description when read in conjunction with the appended drawing.

BRIEF DESCRIPTION OF THE PREFERRED EMBODIMENTS

Figure 1:
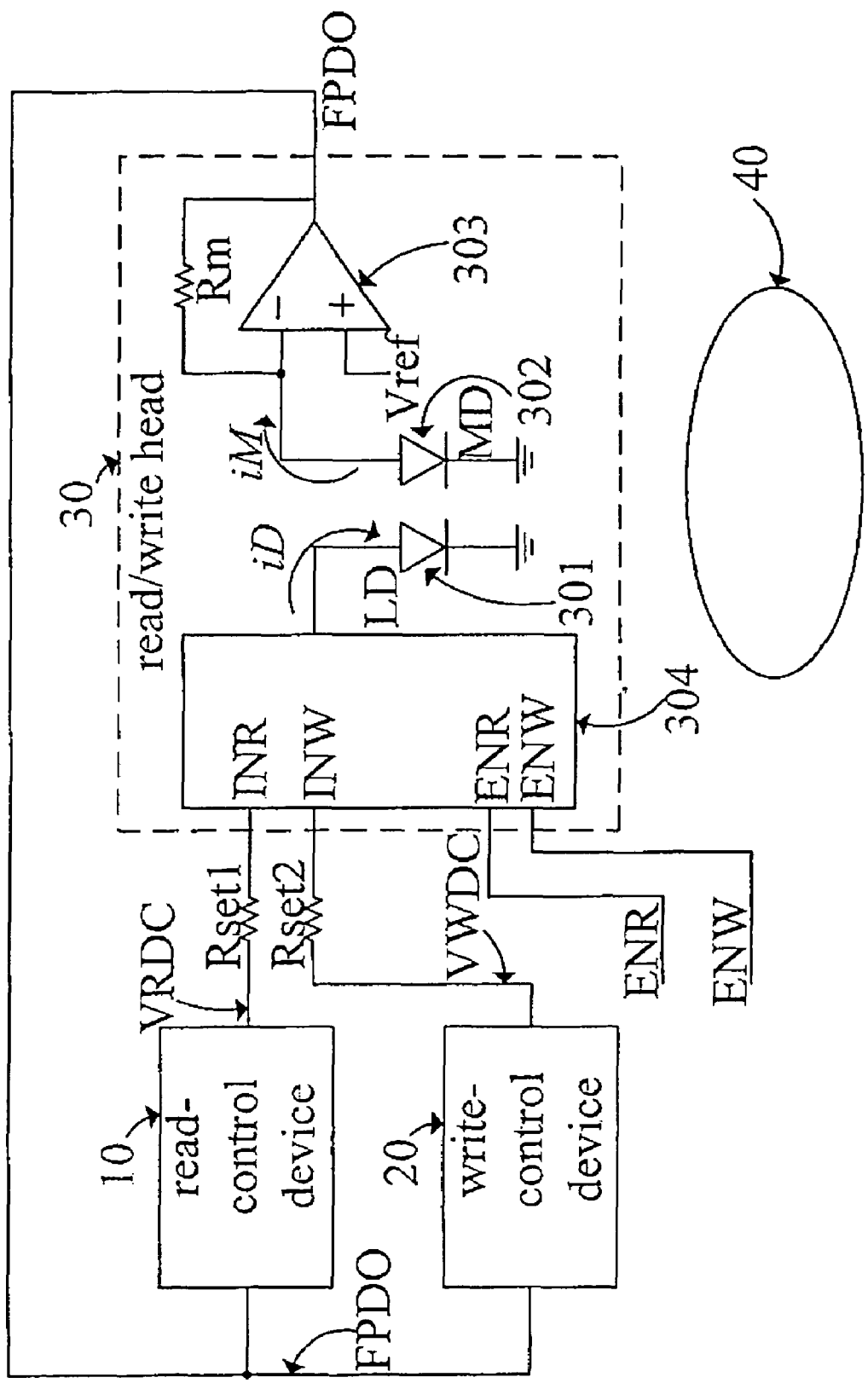
FIG. 1 is a schematic view showing a read/write device of a conventional CD-RW.
Figure 2:
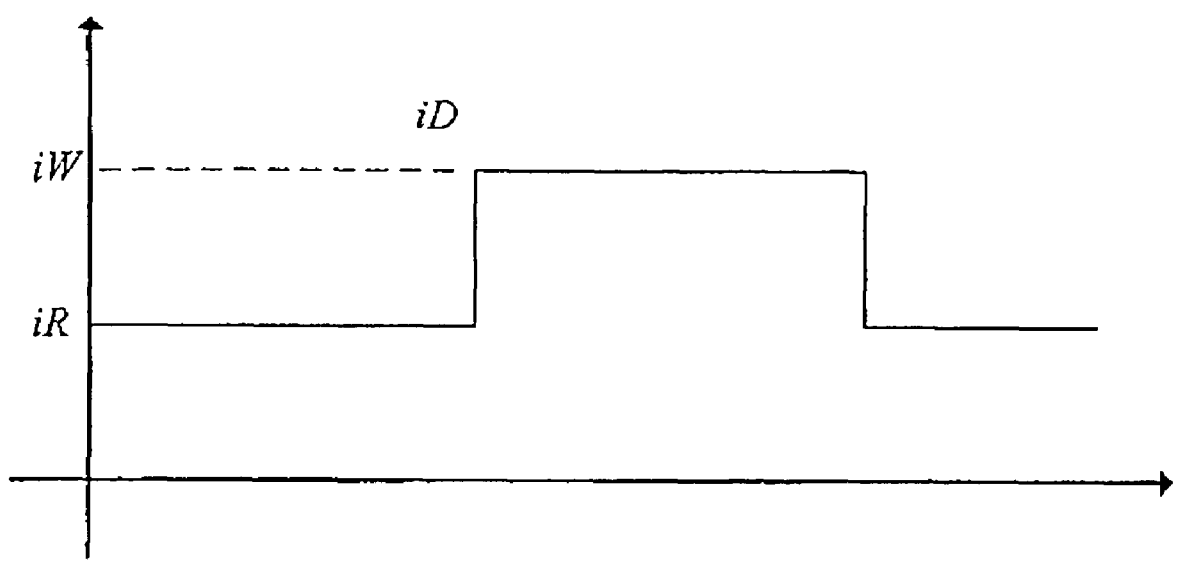
FIG. 2 is a schematic view about the current of a laser diode when a conventional CD-RW is operated.
Figure 3:
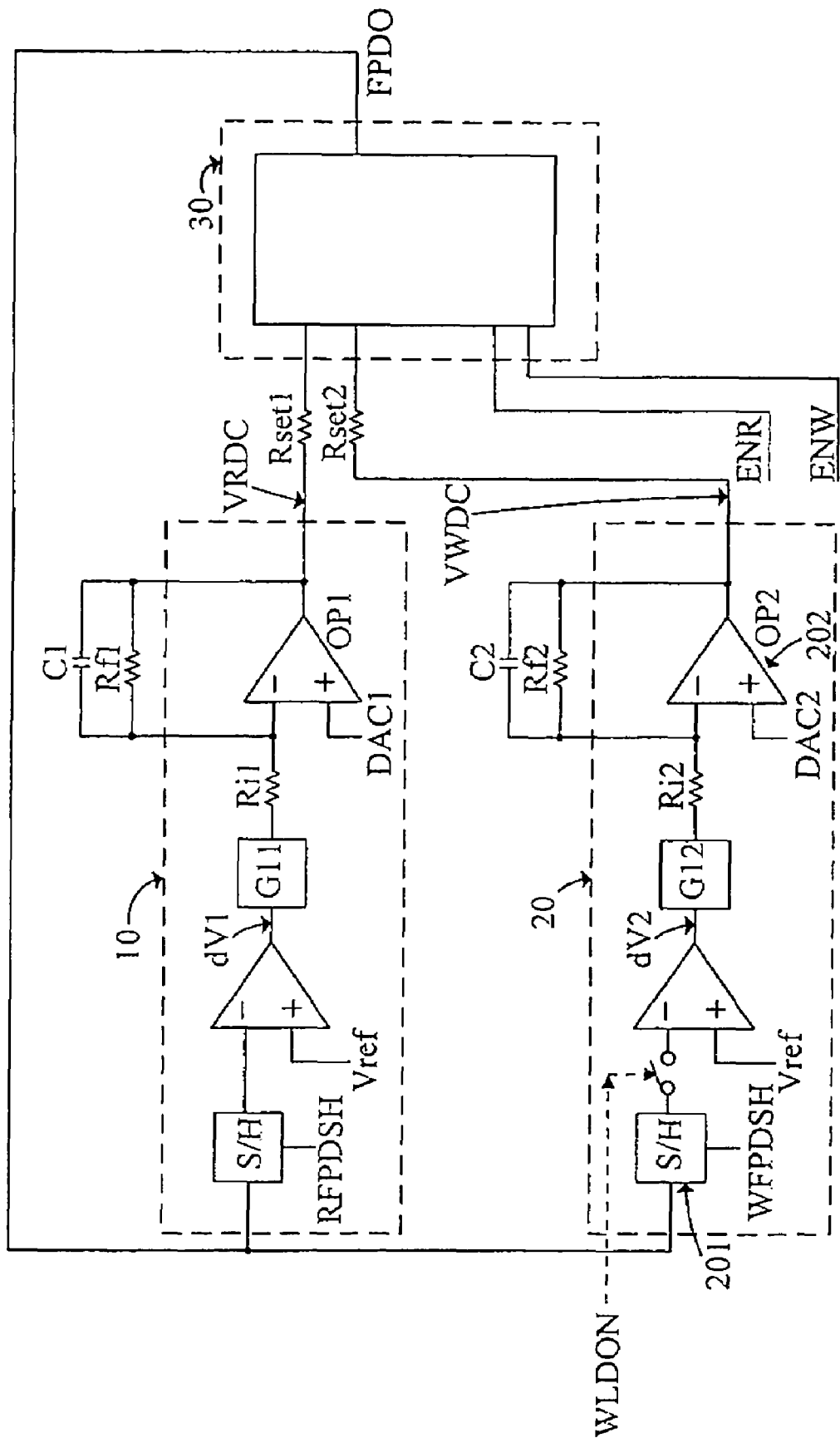
FIG. 3 is the circuit of a read/write device of a conventional CD-RW.
Figure 4:
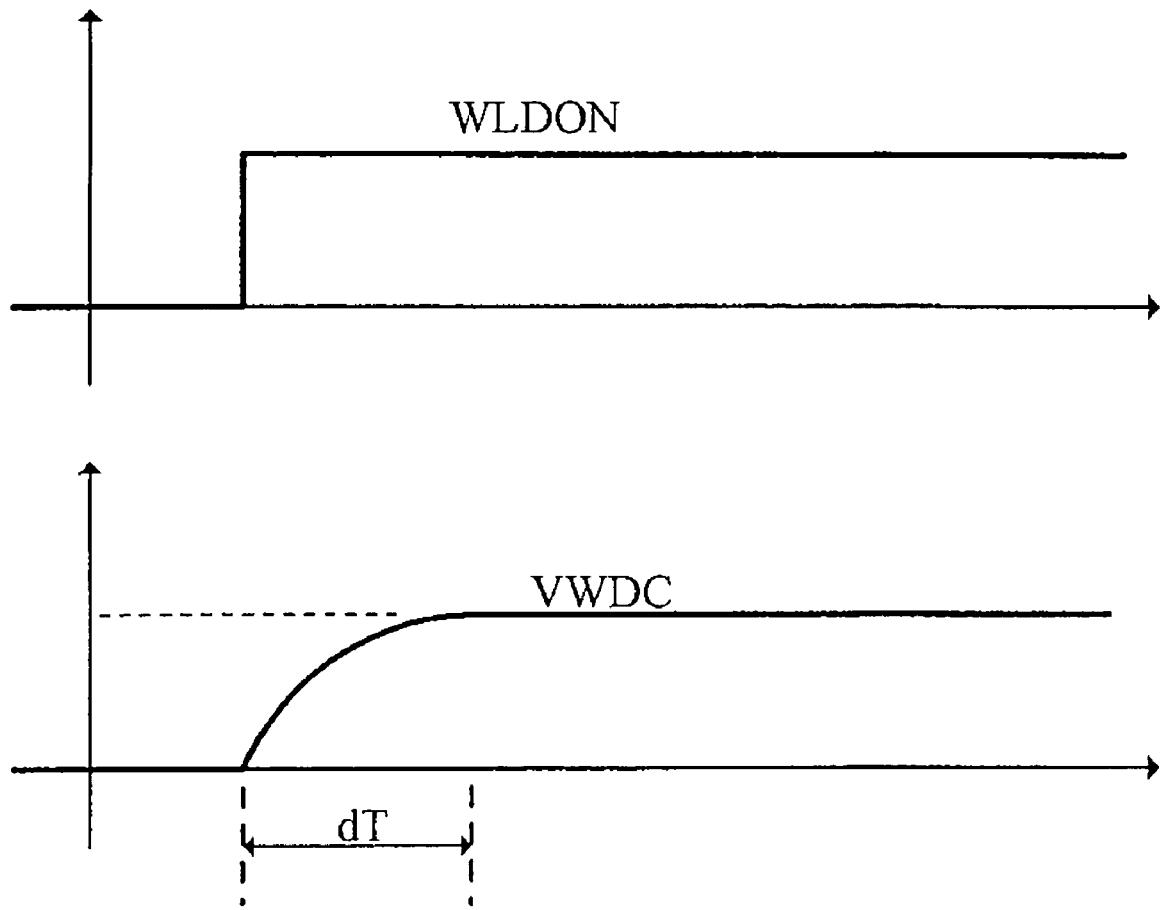
FIG. 4 is a schematic view showing the write-control signal of a write-control device of a conventional CD-RW.
Figure 5:
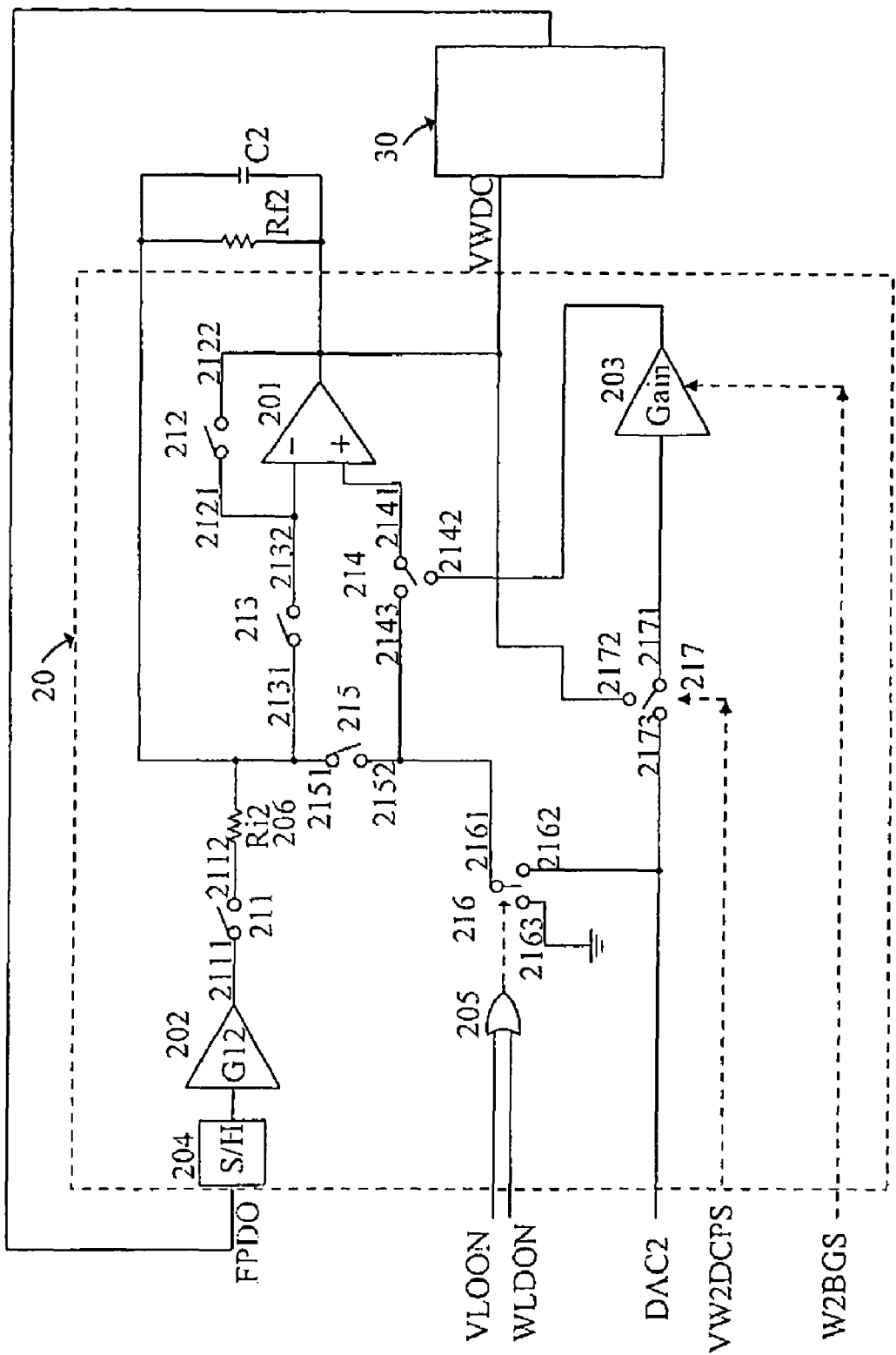
FIG. 5 is a circuit of the write-control device of an optical storage device of the present invention.

Referring to FIG. 5, a write-control device 20 of an optical storage system in accordance with one preferred embodiment of the present invention is illustrated. The write-control device 20 includes an operational amplifier 201, a first gain amplifier 202, a second gain amplifier 203, a sampling and holding circuit 204, seven switches 211-217, an OR gate 205, resistors Ri2 and Rf2 and a capacitor C2. The write-control device 20 controls the read/write head 30 of the CD-RW for reading data from a compact disk (for example the re-writable compact disk 40 shown in FIG. 1).

An input end of the sampling and holding circuit 204 of the write-control device 20 receives the feedback signal FPDO from the read/write head 30 and an output end thereof is connected to an input end of the first gain amplifier 202. An output end of the first gain amplifier 202 is connected to a first end 2111 of the first switch 211. A second end 2112 of the first switch 211 is coupled to a first end 2131 of the third switch 213, a first end 2151 of the fifth switch 215 and an external feedback resistor Rf2 and the capacitor C2 through a resistor 206. The first end 2121 of the second switch 212 is connected to a negative input end of the operational amplifier 201 and the second end 2122 thereof is connected to an output end of the operational amplifier 201. A second end 2132 of the third switch 213 is connected to the first end 2121 of the second switch 212 and the negative input end of the operational amplifier 201. A positive input end of the operational amplifier 201 is connected to a connecting end 2141 of the fourth switch 214, and an output end of the operational amplifier 201 is connected to a first switching end 2172 of the seventh switch 217 and other ends of the resistor Rf2 and the capacitor C2. Moreover, a write-control signal VWDC is outputted to the read/write head 30. A connection end 2171 of the seventh switch 217 is connected to an input end of the second gain amplifier 203 and the second switching end 2173 thereof is connected to a first switching end 2162 of the sixth switch 216 and receives control signal DAC2. A switch control signal VW2DCPS serves to control the connection end 2171 of the seventh switch 217 to be connected to the first switching end 2172 or the second switching end 2173. An output end of the second gain amplifier 203 is connected to a first switching end 2142 of the fourth switch 214. A connection end 2161 of the sixth switch 216 is connected to the second switching end 2143 of the fourth switch 214 and the second end 2152 of the fifth switch 215. The second switching end 2163 of the sixth switch 216 is connected to ground. The sixth switch 216 is controlled by logic OR results of the time period control signals VLOON and WLDON to determine whether the connecting end 2161 is connected to the first switching end 2162 or the second switching end 2163. The WLDON is an indication signal for the write operation. When WLDON is at a high level, it represents that the read/write head 30 is in a write state. VLOON is an indication signal for pre-charging. When VLOON is at high level, it represents that the read/write head 30 is at a pre-charging state. Besides, the switches 211 to 215 can be switched based on respective control signals, while the sixth switch 216 and seventh switch 217 are connected to different switching ends based on respective control signals.

The write-control device 20 can provide the following three circuit configurations based on the states of the switches 211 to 217.

Figure 6:
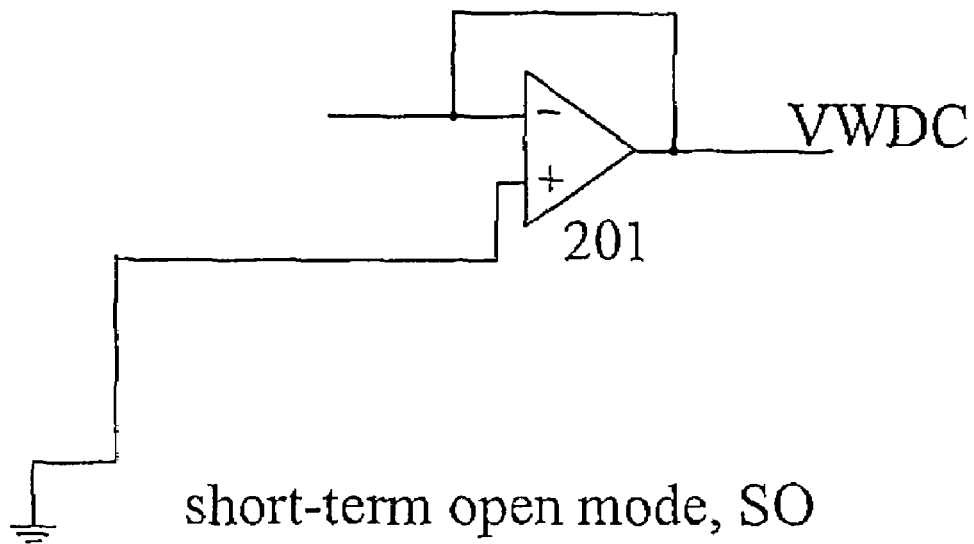
FIGS. 6 to 8 show the equivalent circuits of the write-control system of the present invention.

(1) Short-term open (SO) mode: In this mode, the first switch 211 is turned off, the second switch 212 is turned on and the third switch 213 is turned off. The connection end 2141 of the fourth switch 214 is connected to the second switching end 2143. The fifth switch 215 is turned off and the signals VLOON, WLDON, and VW2DCPS are at low level so that the connection end 2161 of the sixth switch 216 is connected to the second switching end 2163. The connection end 2171 of the seventh switch 217 is connected to the second switching end 2173. An equivalent circuit of this short-term mode is illustrated in FIG. 6. Obviously, in the SO mode, to match the low levels of the VLOON, WLDON and VW2DCPS, and the switching states of the switches 211 to 217, the negative input end of the operational amplifier 201 is coupled to the output end and the positive input end is grounded so as to form a voltage follower. Since the voltage of the write-control signal VWDC has a zero level to meet the virtual grounding of the positive and negative input ends, the write-control signal VWDC can be initiated.

Figure 7:
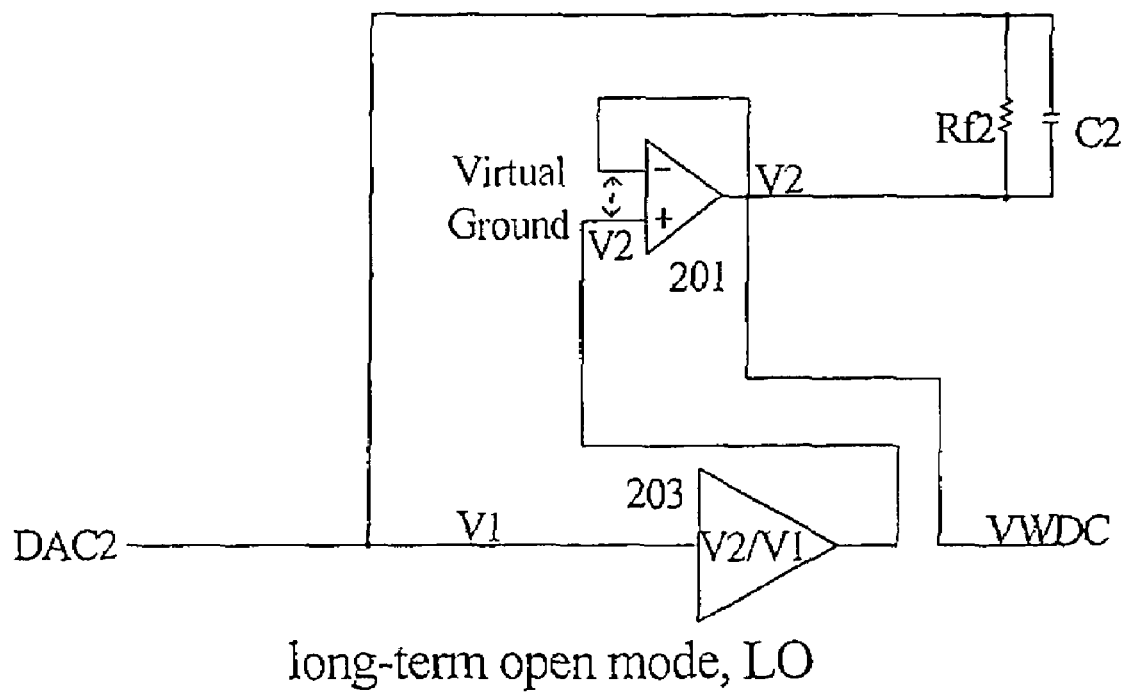

(2) Long term open (LO) mode: In this mode, the first switch 211 is turned off, the second switch 212 is turned on and the third switch 213 is turned off. The connection end 2141 of the fourth switch 214 is connected to the first switching end 2142. The fifth switch 215 is turned on and the signal VLOON is at a high level, and WLDON and VW2DCPS are at low level so that the connection end 2161 of the sixth switch 216 is connected to the first switching end 2162. The connection end 2171 of the seventh switch 217 is connected to the second switching end 2173. An equivalent circuit of this long-term mode is illustrated in FIG. 7. Obviously, in this mode, to match the high level of VLOON, the low levels of the WLDON and VW2DCPS and the switching states of the switches 211 to 217, the negative input end of the operational amplifier 201 is coupled to the output end and the positive input end is coupled to the second gain amplifier 203 so as to receive the amplified digital to analog control signal DAC2. It should be noted that, after the DAC2 is amplified by the second gain amplifier 203, the DAC2 level thereof will be pulled up to V2 from V1 which is a level for CD-RW. Besides, since the positive input end and the negative input end of the operational amplifier 201 are at virtual grounding states, the voltage of the write-control signal VWDC is rapidly charged from zero to a voltage V2 for writing to a CD.

Figure 8:
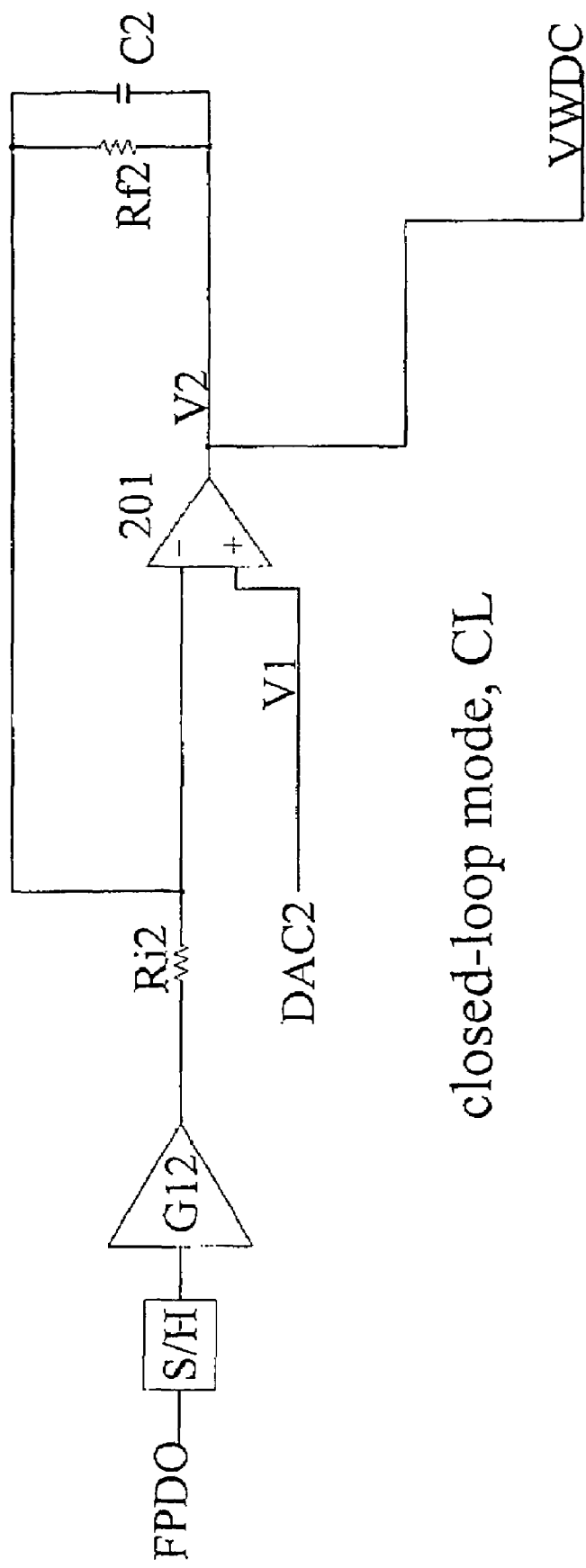

(3) Closed Loop (CL) mode: In this mode, the first switch 211 is turned on, the second switch 212 is turned off and the third switch 213 is turned on. The connection end 2141 of the fourth switch 214 is connected to the second switching end 2143. The fifth switch 215 is turned off and the signals VLOON, WLDON, and VW2DCPS are at high level so that the connection end 2161 of the sixth switch 216 is connected to the first switching end 2162. (The connection end 2171 of the seventh switch 217 is connected to the first switching end 2172.) An equivalent circuit of this closed-loop mode is illustrated in FIG. 8. Obviously, in this mode, to match the low level of VLOON, the high levels of the WLDON and VW2DCPS and the switching states of the switches 211 to 217, the operation of the operational amplifier 201 is same as the conventional write-control device 20 for recording data to a CD. At this time, the positive input end of the operational amplifier 201 is inputted with a DAC2 signal having a voltage level of V1 and the negative input end thereof is coupled to the sampling and holding circuit 204 and the first gain amplifier 202 through the resistor Ri2. A feedback signal FPDO from the read/write head 30 is inputted to the sampling and holding circuit 204, and then processed by the first gain amplifier 202 then inputted to the negative input end of the operational amplifier 201 through the resistor Ri2. The output end of the operational amplifier 201 retains a level of V2 (i.e., a voltage for recording the CD) for recording data to the CD.

In the above operation, before writing data to a CD, the gain parameter of the second gain amplifier 203 of the write-control device 20 is adjusted. That is, the write-control device 20 is switched to the closed loop mode for recording data onto a recording testing area of a CD. If the operation is successful, the voltage level V1 of the digital to analog signal DAC2 and the voltage level V2 of the write-control signal VWDC are indicated. Then, the gain of the second gain amplifier 203 is adjusted to V2/V1 by a gain adjust control signal W2BGS. Thereby, the initiation operation is completed. It is noted that when the recording operation is completed, a short-term mode can be performed again for initializing the write-control signal as zero so that no DC offset existing. Thus, the object of low power consumption is achieved.

Figure 9:
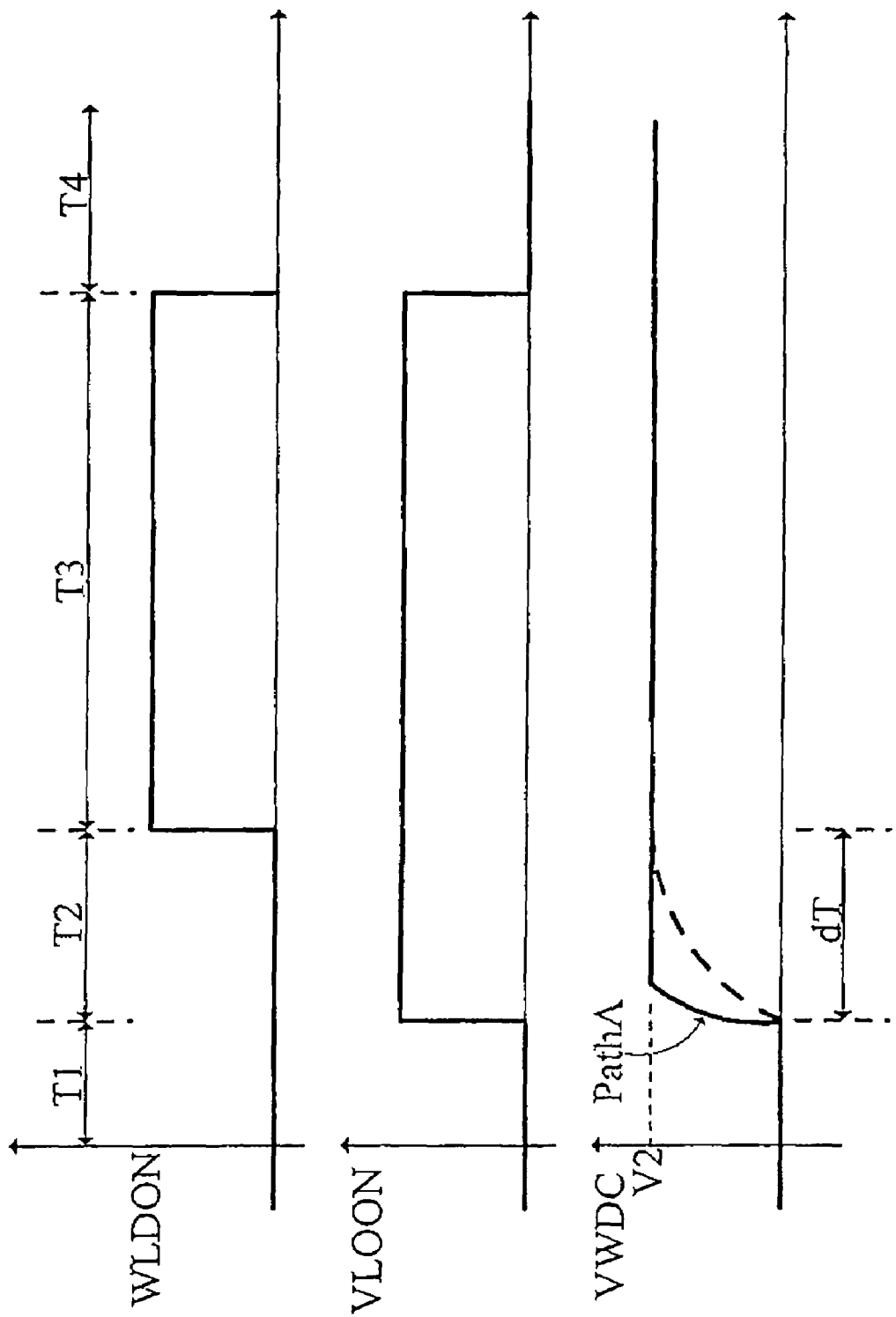
FIG. 9 shows the control signal timing of the write-control device in the optical storage system of the present invention.

FIG. 9 shows the timing clock for one writing operation of the write-control device 20. The writing operation includes four time periods T1 to T4. In time period T1, the time period control signal VLOON and WLDON are at low level and the write-control device 20 is in the short-term open mode. At this mode, the positive input end of the operational amplifier 201 is grounded and the negative input end thereof is connected to the output end so as to form a voltage follower. The voltage of the write-control signal VWDC is virtually grounded so that the level is reduced to zero. Thus, the write-control signal is initiated.

In time period T2, the time period control signal VLOON is at high level, and WLDON is at low level, the write control device 20 is switched to a long-term open mode. At this mode, the second gain amplifier 203 amplifies the voltage of digital to analog signal DAC2 from V1 to V2. As the write-control signal VWDC is virtually grounded, it can be quickly charged to the voltage V2 for recording data onto a CD, as shown in the path A of FIG. 9, rather than slowly charged to the voltage V2 by a capacitor.

In time period T3, the time period control signal VLDON and WLDON are both at high level and the write control device 20 is switched to closed-loop mode. As the conventional write-control device, the write-control device 20 can perform the recording operation normally.

In time period T4, since the recording operation is completed, the time period control signals VLOON and WLDON return to low level, and the write control device 20 is switched to the short-term open mode, whereby the voltage of the write control signal VWDC can be reset to zero.

From the above description, it is known that the write-control device 20 of the present invention generates the time period control signal VLOON so that the write-control signal VWDC charges to the capacitor C2 in advance to achieve a working voltage. When the time period control signal WLDON becomes high level for writing data, since the write-control signal VWDC has been charged to the working voltage, the current $i_D$ of the laser diode LD is at a value for writing data onto a CD. Thus, the errors of the laser diode when writing data due to insufficient current can be avoided. Besides, by the present invention, when the CD-RW is not in a writing operation, the voltage of the write-control signal VWDC can be set as zero so that no DC bias problem generates. Furthermore, the above signals, such as FPDO, VLOON, WLDON, VWDC, VW2DCPS, W2BGS may be referred to VT3190 chips manufactured by VIA Optical Solution, INC. It is noted that in the present invention, the write control device is suitable for any photoelectric system that has a writing operation supported by a photoelectric effect, for example, CD-RW or DVD-RW. In addition, the present invention can be used in other systems, such as CD-RW disk, CD-R disk, etc.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An apparatus for controlling a data write operation in an optical storage system comprising:
    an operational amplifier having a positive input end, a negative input end and an output end for outputting a write-control signal at the output end, the operational amplifier being operated in one of a short-term mode, a long-term mode and a closed-loop mode;
    a first gain amplifier for amplifying a first input signal on its input end;
    a second gain amplifier for amplifying a second input signal on its input end;
    a first switch having a first end connected to an output end of the first gain amplifier;
    a second switch connected to the output end of the operational amplifier and the negative input end of the operational amplifier;
    a third switch having a first end coupled to the first switch and a second end connected to the negative input end of the operational amplifier;
    a fourth switch for coupling the output signal of the second gain amplifier to the positive input end of the operational amplifier;
    a fifth switch having a first end connected to the first switch and a second end connected to the fourth switch;
    a sixth switch for coupling a DAC signal or a ground signal to the fourth switch and fifth switch; and
    a seventh switch for coupling the DAC signal or the output of the operational amplifier to an input end of the second amplifier; wherein:
        in the short-term mode, the operational amplifier is formed as a voltage follower for initializing the write-control signal;
        in the long-term mode, the operational amplifier charges the write-control signal, the output end of the operational amplifier is coupled to the negative input end of the operation amplifier and the positive input end of the operational amplifier is coupled to a voltage level used for recording data onto storage medium for charging the write-control signal such that the positive input end and the negative input end of the operational amplifier are virtually grounded; and in the closed-loop mode, the charged write-control signal is employed to record data on the storage medium.

2. The apparatus for controlling a data write operation in an optical storage system as claimed in 1, wherein in the short-term mode, the positive input end of the operational amplifier is coupled to a reference voltage, and the negative input end thereof is coupled to the output end for forming a voltage follower so as to initialize the write-control signal.

3. The apparatus for controlling a data write operation in an optical storage system as claimed in 2, wherein in the long-term mode, the operational amplifier charges the write-control signal to the voltage level used for recording data onto the storage medium.

4. The apparatus for controlling a data write operation in an optical storage system as claimed in 1, wherein in the closed-loop mode, the operational amplifier inputs a feedback control signal from a read/write head of the apparatus and the feedback control signal is amplified and fed back to the negative input end of the operational amplifier.

5. The apparatus for controlling a data write operation in an optical storage system as claimed in 4, further comprising a sampling and holding circuit, in which the sampling and holding circuit receives the feedback control signal and the feedback control signal is amplified by the first gain amplifier, and the feedback control signal is amplified before being sent to the negative input end of the operational amplifier.

6. The apparatus for controlling a data write operation in an optical storage system as claimed in 1, wherein when the writing operation is completed, the short-term mode is actuated again so as to initialize the write-control signal again.

7. A method for controlling a data write operation in an optical storage system including an operational amplifier having a positive input end, a negative input end and an output end for outputting a write-control signal at the output end, the operational amplifier being operated in one of a short-term mode, a long-term mode and a closed-loop mode, a first gain amplifier for amplifying a first input signal on its input end; a second gain amplifier for amplifying a second input signal on its input end; a first switch having a first end connected to an output end of the first gain amplifier; a second switch connected to the output end of the operational amplifier and the negative input end of the operational amplifier; a third switch having a first end coupled to the first switch and a second end connected to the negative input end of the operational amplifier; a fourth switch for coupling the output signal of the second gain amplifier to the positive input end of the operational amplifier; a fifth switch having a first end connected to the first switch and a second end connected to the fourth switch; a sixth switch for coupling a DAC signal or a ground signal to the fourth switch and fifth switch; and a seventh switch for coupling the DAC signal or the output of the operational amplifier to an input end of the second amplifier; the method comprising the steps of:

executing the short-term mode for initializing a write-control signal by using virtually grounding effect;

executing the long-term mode for charging the write-control signal by using virtually grounding effect, with which the output end of the operational amplifier is coupled to the negative input end of the operational amplifier and the positive input end of the operational amplifier is coupled to a voltage level used for recording data onto a storage medium for charging the write-control signal such that the positive input end and the negative input end of the operational amplifier are virtually grounded; and executing the closed-loop mode for employing the charged write-control signal for recording data onto the storage medium.

8. The method for controlling a data write operation in an optical storage system as claimed in 7, further comprising a step of initializing the write-control signal within the short-term mode.

9. The method for controlling a data write operation in an optical storage system as claimed in 7, further comprising a step of using a digital to analog control signal to control the charging operation of the write-control signal.

10. The method for controlling a data write operation in an optical storage system as claimed in 7, wherein in the closed-loop mode, the write-control signal is used for controlling the recording operation.

11. The method for controlling a data write operation in an optical storage system as claimed in 7, further comprising a step of re-executing the long-term mode after the recording operation for re-initializing the write-control signal.

12. The method for controlling a data write operation in an optical storage system as claimed in 7 further comprising a step of using a first time period control signal, a second time period control signal and a third time period control signal for controlling the operational amplifier to be operated in the short-term mode, the long-term mode and the closed-loop mode, in which the first and second time period control signals are switched between a first level and a second level.

13. A read/write device used in an optical storage system comprising:

a read-control device for generating a read-control signal in response to a feedback control signal;

a write-control device having an operational amplifier for generating a write-control signal in response to the feedback control signal;

a first gain amplifier for amplifying first input signal on its input end;

a second gain amplifier for amplifying second input signal on its input end;

a first switch having a first end connected to an output end of the first gain amplifier;

a second switch connected to the output end of the operational amplifier and the negative input end of the operational amplifier;

a third switch having a first end coupled to the first switch and a second end connected to the negative input end of the operational amplifier;

a fourth switch for coupling the output signal of the second gain amplifier to the positive input end of the operational amplifier;

a fifth switch having a first end connected to the first switch and a second end connected to the fourth switch;

a sixth switch for coupling a DAC signal or a ground signal to the fourth switch and fifth switch; and a seventh switch for coupling the DAC signal or the output of the operational amplifier to an input end of the second amplifier; wherein:

the operational amplifier is formed as a voltage follower for initializing the write-control signal when being operated in a short-term mode;

the operational amplifier charges the write-control signal in advance when being operated in a long-term mode;

the output end of the operational amplifier is coupled to the negative input end of the operational amplifier and the positive input end of the operational amplifier inputs a voltage used for recording data onto a storage medium for charging the write-control signal to a voltage level for writing data to the storage medium such that the positive input end and the negative input end of the operational amplifier are virtually grounded;

the charged write-control signal is used to control an operation of recording data onto the storage medium when the operational amplifier is operated in a closed-loop mode; and a read/write head for generating a laser beam in response to the read-control signals, the write-control signals, a read-enable signal, and a write-enable signal, wherein the read/write head generates a feedback signal based on the laser beam for being fed back to the read-control device and the write-control device.

14. The read/write device as claimed in 13, wherein the operational amplifier has a positive input end, a negative input end and an output end, and the output end of the operational amplifier serves for outputting the write-control signal.

15. The read/write device as claimed in 14, wherein in the short-term mode, the positive input end of the operational amplifier is coupled to a reference voltage, and the negative input end thereof is coupled to the output end for forming a voltage follower so as to initialize the write-control signal.

16. The read/write device as claimed in 14, wherein in the closed-loop mode, the operational amplifier reads a feedback control signal from the read/write head of the write control device and the feedback control signal is amplified and fed back to the negative input end of the operational amplifier.

17. The read/write device as claimed in 16, further comprising: a sampling and holding circuit, wherein the sampling and holding circuit receives the feedback control signal and the first gain amplifier amplifies the feedback control signal and sends the amplified feedback control signal to the negative input end of the operational amplifier.

18. The read/write device as claimed in 13, wherein the long-term mode is executed again after the writing operation for re-initializing the write-control signal.

19. The apparatus as claimed in claim 1, wherein the storage medium is a compact disk.

20. The method as claimed in claim 7, wherein the storage medium is a compact disk.

21. The read/write device as claimed in claim 13, wherein the storage medium is a compact disk.

22. An apparatus for recording data on a storage medium, the apparatus comprising:

an operational amplifier configured to output a write-control signal;
a first gain amplifier configured to amplify a first input signal;
a second gain amplifier configured to amplify a second input signal;
a first switch connected to the first gain amplifier;
a second switch connected to the operational amplifier;
a third switch coupled to the first switch and the operational amplifier;
a fourth switch configured to couple the output signal of the second gain amplifier to the operational amplifier;
a fifth switch connected to the first switch and the fourth switch;
a sixth switch configured to couple a DAC signal or a ground signal to the fourth switch and the fifth switch;
a seventh switch configured to couple the DAC signal or the wire-control signal to the second amplifier;
wherein, the operational amplifier operates in one of a short-term mode, a long-term mode, or a closed-loop mode, further wherein:
the operational amplifier initializes the write-control signal in the short-term mode;
the operational amplifier charges the write-control signal in the long-term mode, and
the charged write-control signal is utilized to record data on the storage medium in the closed-loop mode.

23. The apparatus of claim 22, wherein, in the long-term mode, an output end of the operational amplifier is coupled to a negative input end of the operation amplifier and a positive input end of the operational amplifier is coupled to a voltage level used for recording data onto the storage medium.

24. The apparatus of claim 23, wherein the positive input end and the negative input end of the operational amplifier are virtually grounded.

25. The apparatus of claim 23, wherein in the short-term mode, the positive input end of the operational amplifier is coupled to a reference voltage, and the negative input end of the operational amplifier is coupled to an output end of the operational amplifier to initialize the write-control signal.

26. The apparatus of claim 25, wherein the operational amplifier operates as a voltage follower in the short-term mode.

27. The apparatus as claimed in claim 22, wherein the storage medium is a compact disk.

* * * * *

UNITED STATES PATENT AND TRADEMARK OFFICE
CERTIFICATE OF CORRECTION

PATENT NO.         : 7,554,895 B2                                              Page 1 of 1
APPLICATION NO.    : 10/756779
DATED              : June 30, 2009
INVENTOR(S)        : Ting-Wen Su et al.

It is certified that error appears in the above-identified patent and that said Letters Patent is hereby corrected as shown below:

In column 8, line 24, in claim 12, delete "7" and insert -- claim 7, --, therefor.

In column 8, line 38, in claim 13, after "amplifying" insert -- a --.

In column 8, line 40, in claim 13, after "amplifying" insert -- a --.

In column 9, line 18, in claim 14, delete "13," and insert -- claim 13, --, therefor.

In column 9, line 22, in claim 15, delete "14," and insert -- claim 14, --, therefor.

In column 9, line 27, in claim 16, delete "14," and insert -- claim 14, --, therefor.

In column 9, line 32, in claim 17, delete "16," and insert -- claim 16, --, therefor.

In column 9, line 38, in claim 18, delete "13," and insert -- claim 13, --, therefor.

In column 10, line 18, in claim 22, delete "wire-control" and insert -- write-control --, therefor.

Signed and Sealed this

Twenty-ninth Day of September, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,554,895 B2 |
| APPLICATION NO. | : 10/756779 |
| DATED | : June 30, 2009 |
| INVENTOR(S) | : Su et al. |

Page 1 of 1

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 538 days.

Delete the phrase "by 538 days" and insert -- by 790 days --

Signed and Sealed this

Twenty-seventh Day of April, 2010

David J. Kappos
*Director of the United States Patent and Trademark Office*